United States Patent
Sun et al.

(10) Patent No.: US 10,773,383 B2
(45) Date of Patent: Sep. 15, 2020

(54) ROBOT HIGH FREQUENCY POSITION STREAMING

(71) Applicant: Fanuc America Corporation, Rochester Hills, MI (US)

(72) Inventors: Yi Sun, West Bloomfield, MI (US); Jason Tsai, Bloomfield Hills, MI (US); Sai-Kai Cheng, Rochester Hills, MI (US); James F. Huber, Rochester Hills, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 313 days.

(21) Appl. No.: 15/984,467

(22) Filed: May 21, 2018

(65) Prior Publication Data

US 2018/0333852 A1  Nov. 22, 2018

Related U.S. Application Data

(60) Provisional application No. 62/509,569, filed on May 22, 2017.

(51) Int. Cl.
 *B25J 9/00* (2006.01)
 *B25J 9/16* (2006.01)
 *G05B 19/418* (2006.01)

(52) U.S. Cl.
 CPC ........ *B25J 9/1664* (2013.01); *G05B 19/4185* (2013.01); *G05B 19/41815* (2013.01); *G05B 2219/31261* (2013.01); *Y10S 901/09* (2013.01); *Y10S 901/16* (2013.01)

(58) Field of Classification Search
 CPC ............ B25J 9/1664; G05B 19/41815; G05B 19/4185; G05B 2219/31261; Y10S 901/09; Y10S 901/16; H04W 4/70; H04L 69/162
 See application file for complete search history.

(56) References Cited

U.S. PATENT DOCUMENTS

| | | | | |
|---|---|---|---|---|
| 9,824,019 | B2* | 11/2017 | Castelino | G06F 12/1009 |
| 2016/0030240 | A1* | 2/2016 | Gonenc | G01L 25/00 |
| | | | | 604/95.01 |
| 2018/0333852 | A1* | 11/2018 | Sun | G05B 19/4185 |

* cited by examiner

*Primary Examiner* — Ian Jen
(74) *Attorney, Agent, or Firm* — Shumaker, Loop & Kendrick, LLP; John A. Miller

(57) ABSTRACT

A method and a system stream robot tool center point position to external processors at high frequency. The method includes the steps of: reading robot joint encoder data using an Interrupt Service Routine in the robot controller; calculating tool center point position based on the encoder data; and sending the calculated position data to a network socket in a high priority task. The method achieves tool center point and/or joint position communication at fast and consistent time intervals, as compared to much longer times for prior art methods. A downstream device, such as a processor or controller for another machine, reads the communicated tool center point and/or joint position data and uses it to control the operations of its own device. High speed motion command streaming from outside processors can be used in a similar way to control the robot.

18 Claims, 4 Drawing Sheets

ROBOT HIGH FREQUENCY POSITION STREAMING

CROSS-REFERENCE TO RELATED APPLICATIONS

This application claims the benefit of the priority date of U.S. Provisional Patent Application Ser. No. 62/509,569, titled ROBOT HIGH FREQUENCY POSITION STREAMING, filed May 22, 2017.

BACKGROUND

Field

The present disclosure relates generally to the field of factory robot control/communication and, more particularly, to a method for streaming robot tool center point position to external processors at high frequency, where the method includes reading robot joint encoder data using an Interrupt Service Routine in the robot controller, calculating tool center point position based on the encoder data, and sending the calculated position data to a network socket in a high priority task.

Discussion

Robotic machines are widely used in manufacturing and factory floor environments, where the robots are used to repeatably and cost-effectively perform tasks such as material movement, arc welding, laser welding, laser cutting, material dispensing, etc. Many of these robot-performed tasks require synchronization with motion of another part or a task sequence of another tool. For example, a welding operation cannot be performed until one or more parts are properly positioned, and the welding laser or rod is also properly positioned. Furthermore, as a result of improvements in robots and their controllers, the rate at which the tasks is performed has increased. This rate increase is good for factory operators, as processing more parts in a given amount of time results in a lower cost per part. In addition, as the demand for part quality has increased, it has become necessary for robotic tasks such as cutting and welding to be performed with greater precision.

The task synchronization described above requires a robot to communicate its tool center point position to another robot or processing device. In order to meet the task rate and precision requirements discussed above, the communication of tool center point position is required at high frequency. However, existing techniques for calculating and communicating tool center point position have been unable to accommodate the communication frequency required.

SUMMARY

In accordance with the teachings of the present disclosure, a method and a system for streaming robot tool center point position to external processors at high frequency are disclosed. The method includes reading robot joint encoder data using an Interrupt Service Routine in the robot controller, calculating tool center point position based on the encoder data, and sending the calculated position data to a network socket in a high priority task. The method achieves tool center point and/or joint position communication at fast and consistent time intervals, as compared to much longer times for prior art methods. A downstream device, such as a processor or controller for another machine, reads the communicated tool center point and/or joint position data and uses it to control the operations of its own device. High speed motion command streaming from outside processors can be used in a similar way to control the robot.

Additional features of the presently disclosed methods and systems will become apparent from the following description and appended claims, taken in conjunction with the accompanying drawings.

DETAILED DESCRIPTION OF THE EMBODIMENTS

The following discussion of the embodiments of the disclosure directed to robot high frequency tool center point position streaming is merely exemplary in nature, and is in no way intended to limit the disclosed techniques or their applications or uses. For example, the technique is described in the context of factory floor part processing, but is equally applicable to any other robot task or application. In respect of the methods disclosed, the steps presented are exemplary in nature, and thus, steps may be added, removed or reordered without departing from the spirit and scope of the invention.

Figure 1:
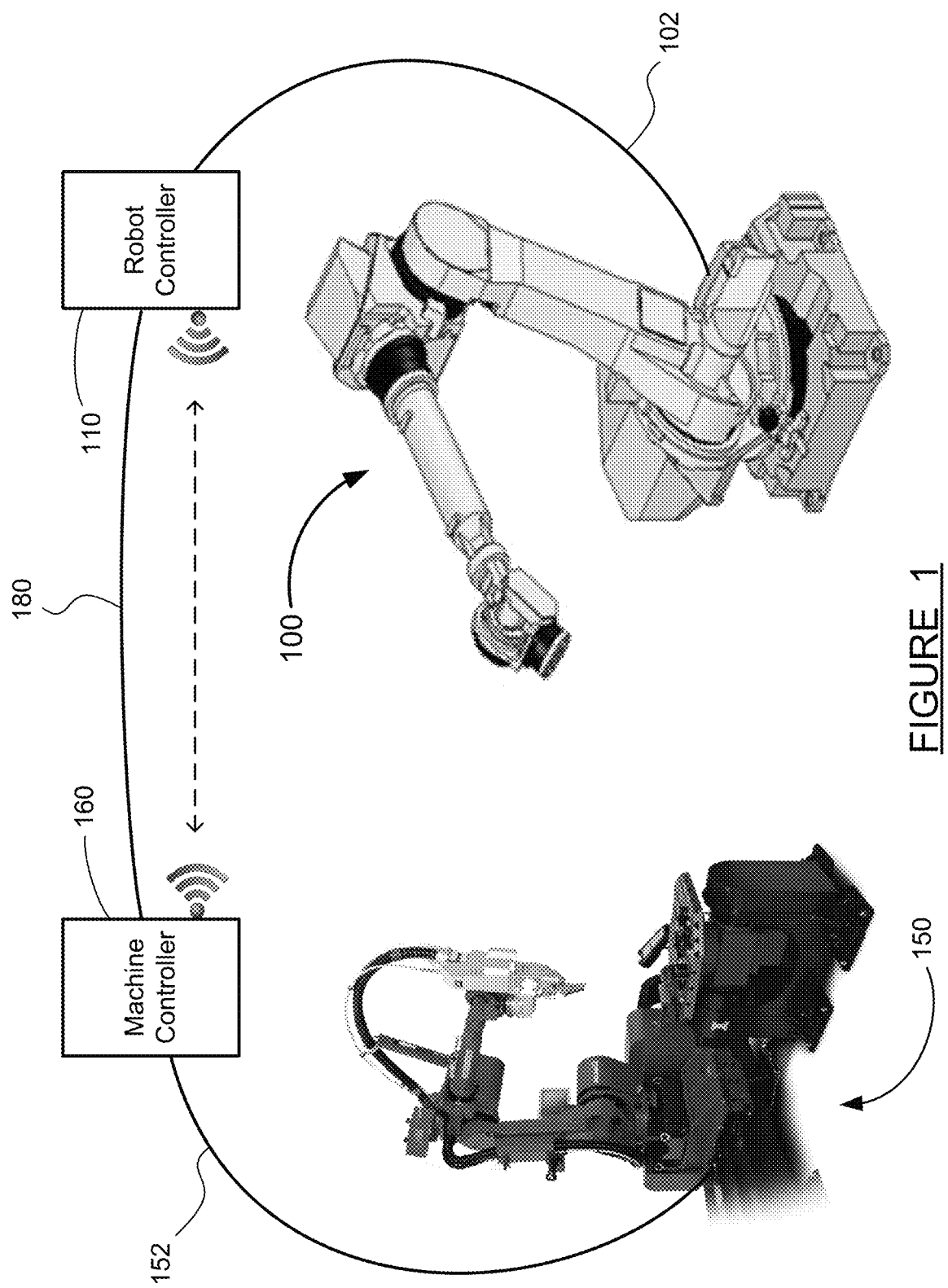
FIG. 1 is an illustration of a factory floor operation where a robot performs tasks in synchronization with another machine.

FIG. 1 is an illustration of a factory floor operation where a robot 100 performs tasks in synchronization with another machine 150. The robot 100 may be a six-axis type robot as shown in FIG. 1, or any other type of robot. In the discussion of FIG. 1 and the following figures, it is to be understood that the robot 100 is operating at its own pace, and the other machine 150 is programmed to operate in synchronization with the robot 100. In other words, the robot 100 is the master device, and the machine 150 is the slave device. Thus, the machine 150 needs to know the tool center point position of the robot 100, which the machine 150 uses to determine its own motions.

The robot 100 communicates bidirectionally on a line 102 with a robot controller 110, in a manner known in the art. That is, the controller 110 sends joint position commands to the robot 100 which instruct the robot 100 how to move, and the robot 100 provides the controller 110 with joint encoder data defining the actual positions of the joint servomotors. The machine 150 communicates on a line 152 with a controller 160. The machine 150, shown in FIG. 1 as a laser welder, may be any applicable type of machine—such as a laser or arc welder, a laser cutter, a machine tool of any sort, a material movement or dispensing machine, etc. The controller 160 receives robot tool center point position data from the robot controller 110 on a line 180. The controller 160 may also communicate wirelessly with the robot controller 110, as shown.

The basic architecture of FIG. 1, where a robot provides tool center point position data to another machine, is well known. However, prior methods of communicating robot tool center point position data are not fast enough to meet the requirements of many modern factory operations. For example, the machine 150 may require tool center point position data every 2.0 milliseconds (ms) in order to meet the precision and processing speed requirements, but prior designs of the robot controller 110 can only provide the data about every 8.0 ms.

Thus, an improved technique has been developed which uses the same basic architecture of FIG. 1, but implements the tool center point position calculation in the robot controller 110 in a new way which greatly increases the speed at which the position data can be communicated. The techniques discussed below make these robot-machine synchronous task applications possible without the use of external sensors, which have sometimes been used as a workaround to provide tool center point position data at high speed.

Figure 2:
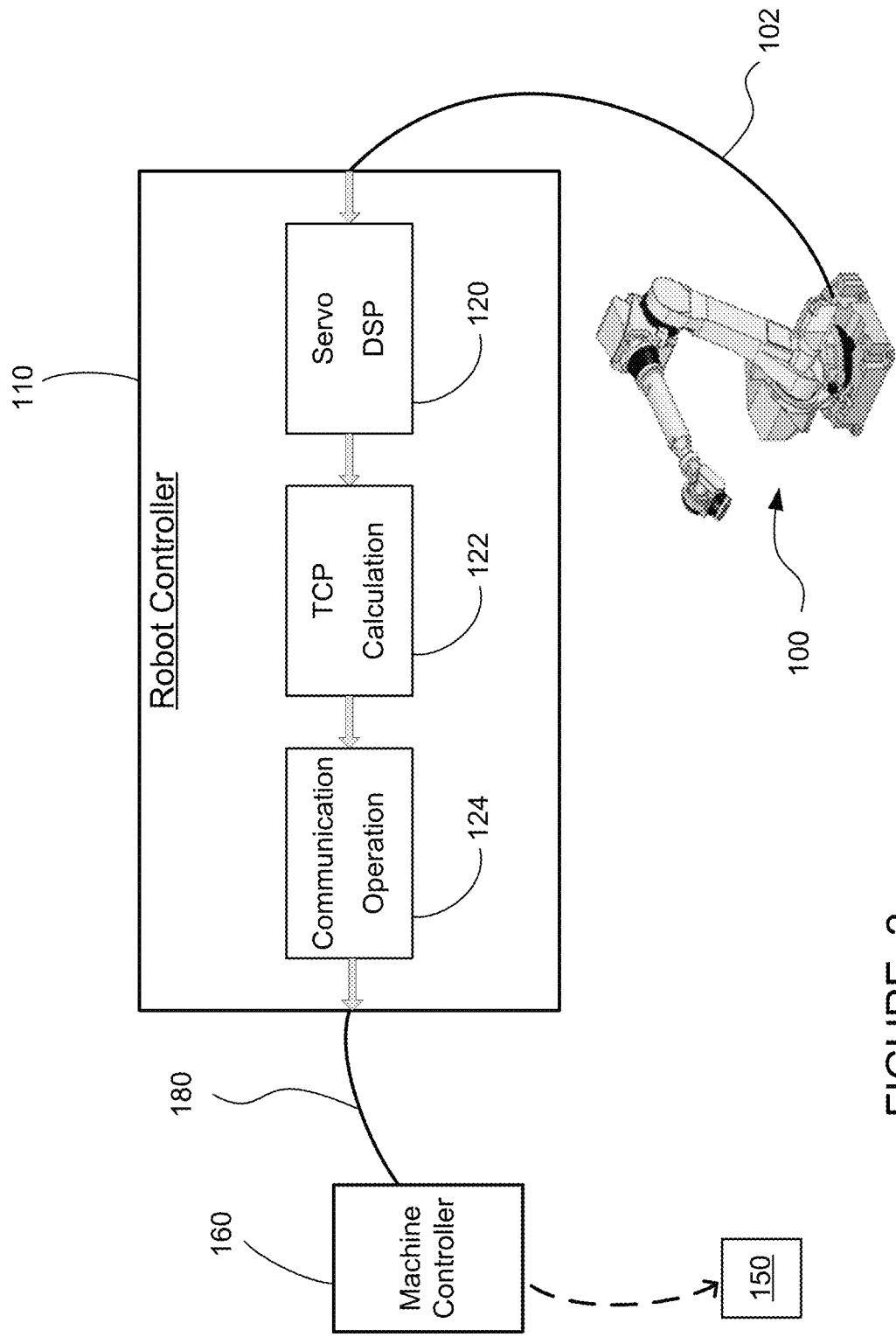
FIG. 2 is a block diagram illustrating the connectivity between the robot, the robot's controller and the other machine's controller, where tool center point position streaming is needed.

FIG. 2 is a block diagram illustrating the connectivity between the robot 100, the robot controller 110 and the other machine's controller 160, where tool center point position streaming is needed. FIG. 2 shows the same connectivity illustrated in FIG. 1, and also provides a high level depiction of what happens in the controller 110. FIG. 2 applies to both prior methods of providing tool center point position, and to the new techniques of the present disclosure.

As shown previously in FIG. 1, the robot 100 is connected to the controller 110 by the line 102, which carries data and signals back and forth between the robot 100 and the controller 110. For instance, the controller 110 sends position commands to the robot 100, and the robot 100 sends joint position data to the controller 110. The controller 110 performs three basic operations in order to provide the tool center point position data to the other machine's controller 160 on the line 180. The controller 110 receives joint encoder angular position data on the line 102. A digital signal processor (DSP) 120 processes the raw joint encoder data and provides the joint position data in a format suitable for a forward kinematic calculation at a block 122. In other words, the DSP block 120 provides joint angular positions at a particular instant in time for all six joints in the six-axis robot 100, based on the signals received on the line 102.

The block 122 performs forward kinematics calculations to determine the tool center point position. The forward kinematics calculations operate in a manner known in the art, where the angle of the robot base joint (J1) is used to determine a position of the shoulder joint (J2), the angle of J2 is used along with the length of the inner arm to determine the position of the elbow joint (J3), etc. This forward kinematic calculation continues to the wrist joint, and results in a tool center point position. The tool center point position calculation may be performed in a robot-centric coordinate system, and then converted to a global Cartesian coordinate system (defined relative to the factory floor, for example) using the robot base joint angle.

Each time tool center point position is calculated at the block 122, it is provided, along with a time stamp, to a communication block 124. The communication block 124 communicates the tool center point position data out on the line 180, using a standard network interface or any other suitable technique.

The previous method of calculating and outputting tool center point position runs as part of the robot command interpolation routine, at a command interpolation rate. The position calculations performed at command interpolation rate can only provide a tool center point position calculation every command interpolation interval, and no faster. As discussed above, tool center point position output is needed at a rate faster than the interpolation interval in order to meet the requirements of the machine 150. Therefore, the new technique discussed below has been developed.

Figure 3:
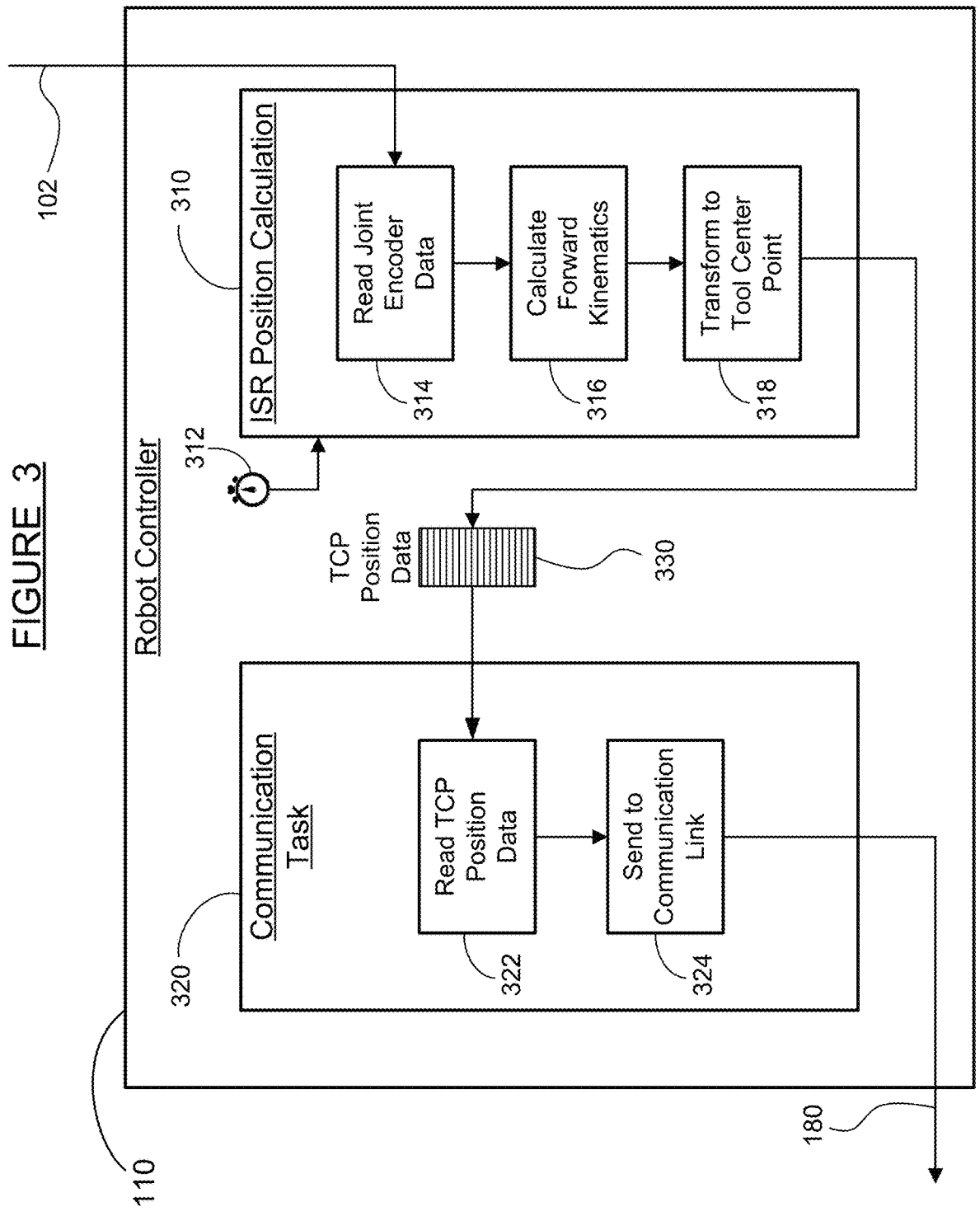
FIG. 3 is a block diagram illustrating a partial software architecture of the robot's controller and the processing steps performed therein for high frequency tool center point position streaming, according to an embodiment of the present disclosure.

FIG. 3 is a block diagram illustrating a partial software architecture of the robot controller 110 and the processing steps performed therein for high frequency tool center point position streaming, according to an embodiment of the present disclosure. FIG. 3 is a detailed depiction of how the controller 110 is configured in order to meet the high speed tool center point position communication requirement.

The basic concept of the new design of the controller 110 is to perform the tool center point position calculations in an Interrupt Service Routine instead of in the normal command interpolation routine. An interrupt handler, also known as an interrupt service routine (ISR), is a callback subroutine in an operating system (OS) or device driver whose execution is triggered by the reception of an interrupt. In an ISR, when a piece of hardware (a hardware interrupt) or some OS task (software interrupt) needs to run, it triggers an interrupt. If these interrupts aren't masked (ignored), the OS will stop what it is doing and call some special code (the ISR) to handle this event. This immediate execution characteristic of an ISR enables tool center point position calculation at much higher speeds than were previously possible.

The controller 110 includes an ISR position calculation module 310 and a communication task 320, along with other software routines (not shown) such as the robot command interpolation routine mentioned earlier. A system clock 312 is used to trigger the ISR module 310 at a certain frequency. In one non-limiting preferred embodiment, the clock 312 triggers the ISR module 310 to execute at a faster rate than command interpolation (that is, a frequency of 500 Hz or higher). It is important that the frequency of execution and the speed of execution of the ISR module 310 are compatible with the controller capability. The ISR module 310 must complete its execution before being triggered again, or else data will be lost, and/or other system interrupts will be masked or ignored.

The controller 110 communicates with the robot 100 on the line 102, as discussed previously. In particular, the controller 110 receives joint position encoder data on the line 102. When the clock 312 triggers the ISR module 310 to execute, the joint position data is read from the line 102 at a block 314. For example, for the six-axis robot 100, six angular joint positions are read at the block 314. Signal processing, such as DSP, may be included in the block 314. At a block 316, the positional configuration of the robot 100 is computed in a forward kinematics calculation using the joint encoder data from the block 314. The forward kinematics calculation determines the position and orientation of each joint based on the spatial position of the preceding joint in the kinematic chain, along with the angular position of the preceding joint and the length of the intervening robot arm.

At a block 318, the tool center point position is calculated in a "world" coordinate system, such as a Cartesian coordinate system defined as fixed to the factory floor, using the output of the forward kinematics calculation. The calculations at the block 316 may be performed in a robot-fixed coordinate system, and tool center point position transformed to the world coordinate system at the block 318. The tool center point position data preferably includes tool center X/Y/Z positions in world coordinates along with three rotational angles sufficient to define the tool center point position and orientation. In one embodiment, the three rotational angles are Euler angles. Tool center point position data from the block 318 is output to a tool center point position data buffer 330. At this time, the ISR routine 310 has completed one cycle of execution, and is ready for the next interrupt to be sent by the clock 312.

The communication task 320 simply reads the tool center point position data from the buffer 330 at a block 322, and sends each set of tool center point position data along with a corresponding time stamp to a communication link at a block 324. The communication task 320 is preferably a high priority system task. It has been found that the high priority communication task 320 is able to keep up with the data calculations of the ISR module 310, so that the buffer 330 does not accumulate a growing backlog of unsent data. Thus, the communication task 320 performs the required function at the required speed, without unnecessarily being added into the ISR module 310 which would lengthen the execution time of the ISR module 310.

The communication link may be a standard network socket. In one embodiment, the network socket uses User Datagram Protocol (UDP) communication protocol. The tool center point position data from the communication task 320 is output from the controller 110 on the line 180, which provides the data to the controller 160 for controlling the other machine 150, as discussed previously.

The technique described above for the controller 110 to compute and output tool center point position at high frequency has been demonstrated to be capable of reliably outputting position data at 2.0 ms intervals, as discussed above. A similar technique is also envisioned for high speed motion command streaming from outside processors. In other words, if the robot 100 is designated as a slave to another device, such as the machine 150, then the machine 150 could output its position data or some sort of command trigger at high speed (such as 2.0 ms intervals), and the robot 100 can be configured to follow the high speed command streaming from the other machine 150. In this case, the controller 110 would use an ISR module to read the command data at a higher frequency than normal command interpolation rate, and would use an inverse kinematic calculation in the ISR module to compute and send robot position commands.

Figure 4:
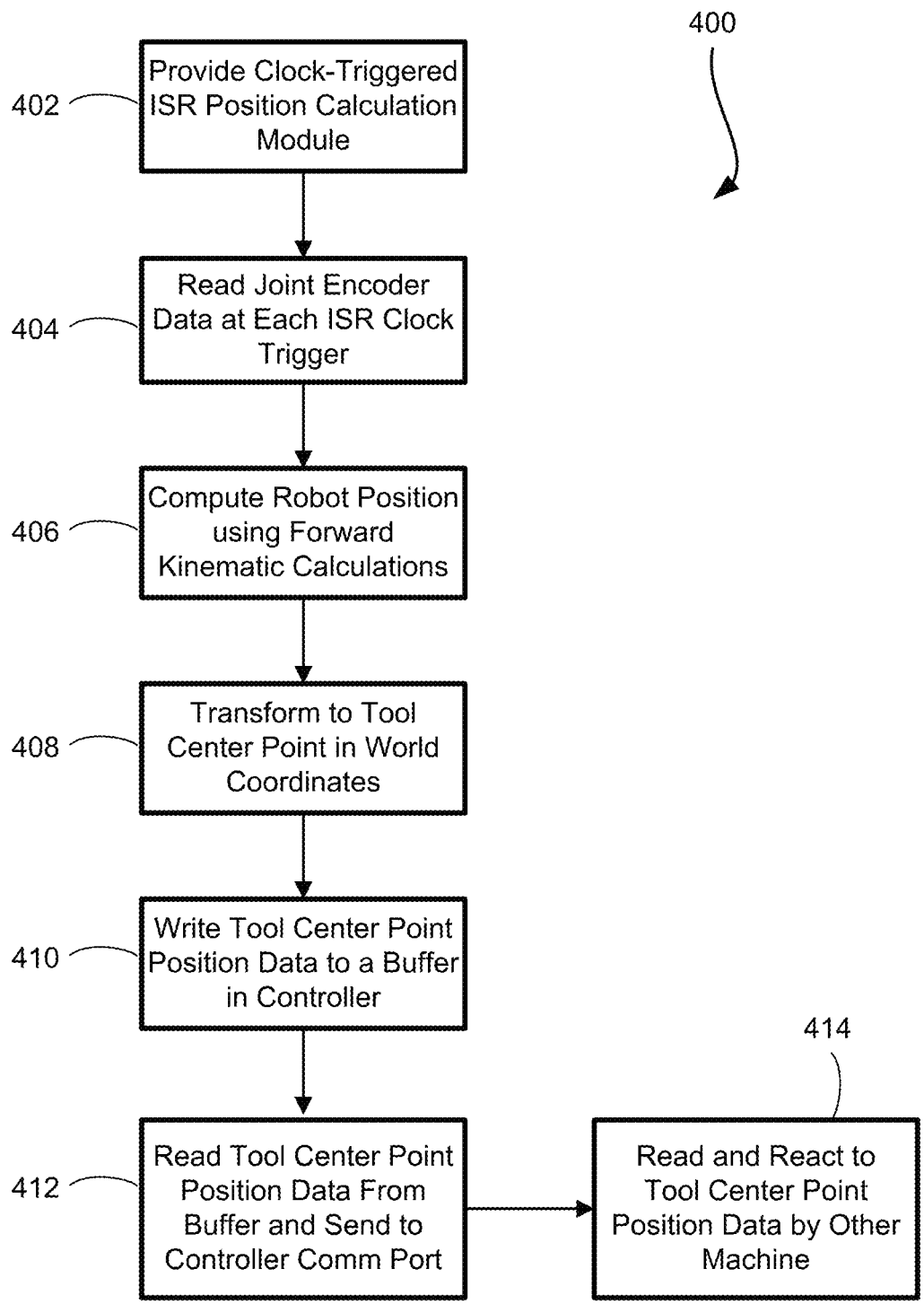
FIG. 4 is a flowchart diagram of a method for communicating tool center point position at high frequency from a robot controller to another device, according to embodiments of the present disclosure.

FIG. 4 is a flowchart diagram 400 of a method for communicating tool center point position at high frequency from a robot controller to another device, according to embodiments of the present disclosure. At box 402, an ISR position calculation module 310 is provided in the controller 110, where the ISR module is clock-triggered at a frequency such as 500 Hz which is significantly faster than a normal command interpolation rate. At box 404, joint encoder data is read by the ISR module 310 at every clock trigger. The joint encoder data is received on the line 102 from the robot 100, and provides joint angular position for each of the joints in the robot 100.

At box 406, the position of the robot 100 is computed using forward kinematic calculations, based on the joint encoder data. The calculations at the box 406 determine the complete position of the robot 100, including the location and angle of all of the joint centers from the robot base out through the wrist joint. At box 408, the tool center point position is calculated in world coordinates, including any final position calculation for the tool itself mounted on the wrist, and transformation from robot-centric coordinates to world coordinates. The calculations at the boxes 406 and 408 are performed in the ISR module 310 for each set of joint encoder data read at the box 404—that is, once for each ISR clock trigger.

At box 410, the ISR module 310 writes the tool center point position data to a buffer 330 in the controller 110. At box 412, a controller communication task 320 reads the tool center point position data from the buffer and sends the data to a communication port on the controller 110. The controller communication task 320 is preferably a high priority task. In one embodiment, the communication port is an Ethernet port using a UDP protocol. At box 414, the controller 160 for the other machine 150 reads the tool center point position data from the controller 110. The controller 160 formulates commands for the machine 150 based on the tool center point position of the robot 100, and sends the commands to move the machine 150 accordingly.

It is to be understood that the software applications and modules described above are executed on one or more computing devices having a processor and a memory module. For example, the robot command interpolation, the ISR position calculation and the communication task all execute on the controller 110, while the controller 160 performs similar computations for the machine 150. Furthermore, the machine-controller and controller-controller communication may be via hardwire cable connection or may use any suitable wireless technology—such as a cellular phone/data network, Wi-Fi, broadband Internet, Bluetooth, etc.

The methods and systems disclosed above were conceived as a way to provide tool center point position data from a robot at much higher frequencies than were possible with previous techniques. Using a custom ISR module for joint position data read and tool center point position calculation, the disclosed techniques have been demonstrated to reliably and repeatably deliver high speed robot position data to a downstream machine. The robot tool center point position data being provided at 2 ms intervals, instead of the 8 ms or longer of prior techniques, enables the downstream machine and the entire production process to run at higher speeds and with greater precision.

The foregoing discussion describes merely exemplary embodiments of the disclosed methods and systems. One skilled in the art will readily recognize from such discussion and from the accompanying drawings and claims that various changes, modifications and variations can be made therein without departing from the spirit and scope of the disclosed techniques as defined in the following claims.

What is claimed is:

1. A method for robot high frequency position streaming, said method comprising:

providing a robot controller in communication with a robot, said robot controller including a processor and memory, said robot controller also being in communication with a machine controller;

executing an interrupt service routine (ISR) module on the processor in the robot controller upon detection of an interrupt signal, where the ISR module is programmed to determine a tool center point position;

providing the tool center point position and a corresponding timestamp to a buffer in the robot controller at each execution of the ISR module, where each tool center point position and corresponding timestamp forms a data set; and reading the data sets from the buffer by a communication task running on the processor and sending the data sets to a network port of the robot controller.

2. The method according to claim 1 wherein the ISR module, upon each detection of the interrupt signal, performs steps including;
   reading robot joint position data;
   calculating a robot positional configuration using forward kinematics calculations based on the joint position data; and
   determining the tool center point position based on the robot positional configuration and a shape of a tool attached to a robot wrist, including transforming the tool center point position to a world Cartesian coordinate system.

3. The method according to claim 2 wherein the robot joint position data is provided by joint encoders on the robot.

4. The method according to claim 3 further comprising preprocessing signals from the joint encoders, where preprocessing includes digital signal processing.

5. The method according to claim 2 wherein the tool center point position includes three orthogonal position values in the world Cartesian coordinate system and three angular orientations.

6. The method according to claim 1 wherein the interrupt signal is provided by a system clock.

7. The method according to claim 1 further comprising reading the data sets from the network port of the robot controller by the machine controller, formulating commands based on the tool center point position, and sending the commands to a machine for execution by the machine.

8. The method according to claim 1 further comprising receiving commands from the machine controller by the robot controller, processing the commands in the ISR module, and sending instructions to the robot.

9. The method according to claim 1 wherein the processor in the robot controller also executes a command interpolation routine, and an execution cycle time of the ISR module is faster than and independent of execution of the command interpolation routine.

10. A method for robot high frequency position streaming, said method comprising:
   providing a robot controller in communication with a robot, said robot controller including a processor and memory, said robot controller also being in communication with a machine controller;
   executing an interrupt service routine (ISR) module on the processor in the robot controller upon detection of an interrupt signal, where the ISR module is programmed to perform steps including reading robot joint position data, calculating a robot positional configuration using forward kinematics calculations based on the joint position data, and determining a tool center point position based on the robot positional configuration and a shape of a tool attached to a robot wrist;
   providing the tool center point position and a corresponding timestamp to a buffer in the robot controller at each execution of the ISR module, where each tool center point position and corresponding timestamp forms a data set;
   reading the data sets from the buffer by a communication task running on the processor and sending the data sets to a network port of the robot controller, where the network port uses User Datagram Protocol (UDP); and
   reading the data sets from the network port of the robot controller by the machine controller, formulating commands based on the tool center point position, and sending the commands to a machine for execution by the machine.

11. The method according to claim 10 wherein the interrupt signal is provided by a system clock at regular intervals.

12. The method according to claim 10 further comprising receiving command signals from the machine controller by the robot controller, processing the command signals in the ISR module to formulate instructions, and sending the instructions to the robot.

13. A robot high frequency position streaming system, said system comprising:
   a robot;
   a machine controller controlling a machine to work in synchronization with the robot based on robot tool center point position data; and
   a robot controller in communication with the robot and the machine controller, said robot controller including a processor and memory, where the processor is configured to;
   execute an interrupt service routine (ISR) module upon detection of an interrupt signal, where the ISR module performs steps including reading robot joint position data, calculating a robot positional configuration using forward kinematics calculations based on the joint position data, and determining a tool center point position based on the robot positional configuration and a shape of a tool attached to a robot wrist;
   provide the tool center point position and a corresponding timestamp to a buffer in the robot controller at each execution of the ISR module, where each tool center point position and corresponding timestamp forms a data set; and
   read the data sets from the buffer by a communication task and send the data sets to a network port of the robot controller for communication to the machine controller.

14. The system according to claim 13 wherein the interrupt signal is provided by a system clock at regular intervals.

15. The system according to claim 13 wherein the robot joint position data is provided by joint encoders on the robot.

16. The system according to claim 13 wherein the tool center point position includes three orthogonal position values in a world Cartesian coordinate system and three angular orientations.

17. The system according to claim 13 wherein the machine controller reads the data sets from the network port of the robot controller, formulates commands based on the tool center point position, and sends the commands to the machine for execution by the machine.

18. The system according to claim 13 wherein the processor in the robot controller is further configured to receive commands from the machine controller, process the commands in the ISR module to formulate instructions, and send the instructions to the robot.

* * * * *